United States Patent
Macaulay et al.

(10) Patent No.: US 6,226,512 B1
(45) Date of Patent: May 1, 2001

(54) APPARATUS AND METHOD FOR DISPLAYING CALLER ATTRIBUTES

(75) Inventors: Robert Paul Macaulay, Gloucester; Brian Egan, Stittsville, both of (CA)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/090,188

(22) Filed: Jun. 4, 1998

(51) Int. Cl.[7] .................................................. H04M 3/42
(52) U.S. Cl. ......................... 455/414; 455/415; 455/413; 455/566
(58) Field of Search ................................... 455/414, 415, 455/566, 412, 413, 422, 419, 550, 575, 517; 379/88.19, 88.2, 88.21

(56) References Cited

U.S. PATENT DOCUMENTS

| | | | |
|---|---|---|---|
| 5,557,605 | * | 9/1996 | Grude et al. ........................ 455/415 |
| 5,581,599 | | 12/1996 | Tsuji et al. ............................ 379/63 |
| 5,875,403 | * | 2/1999 | Christal ................................ 455/550 |
| 5,883,943 | * | 3/1999 | Siddiqui ........................... 455/415 X |

\* cited by examiner

Primary Examiner—Lee Nguyen
Assistant Examiner—Philip J. Sobutka

(57) ABSTRACT

During the occurrence of an incoming call to a portable handset within an in building telephone system, a method is disclosed for providing additional information about the calling party, beyond simply their name or number, to a display on the handset. The name or number of the calling party is extracted by a central switching controller and is used as a reference in the look up of additional calling party attributes from a database located within a personal computer connected to the central switching controller. If the name or number of the calling party is found in the database, a data session is started between the called handset and the database. Following the starting of the data session, the first attribute in the database for the calling party is written to the display of the called handset and additional attributes are offered to the user. The incoming voice call is also offered to the display and a call acceptance signal from the called handset results in the establishing of a voice communication connection between the handset and the calling party. The offering of additional attributes for the calling party continues after the establishing of the voice communication connection between the called handset and the calling party.

42 Claims, 6 Drawing Sheets

APPARATUS AND METHOD FOR DISPLAYING CALLER ATTRIBUTES

FIELD OF THE INVENTION

This invention relates to a system and method for a server based telephone system wherein interactive handsets can operate within a data communication mode and a voice communication mode concurrently.

BACKGROUND OF THE INVENTION

Wireless in building telephones deploying a pico-cellular architecture allow employees to work away from their desks without the worry associated with missing incoming callers. A communication system such as this consisting of a central controller, base stations connected to the controller, and wireless handsets carried by the employees have allowed increased freedom and accessibility in the work place.

The central controller manages all incoming calls for the individual wireless handsets using an in building telecommunication network. The network is divided into cells which service the handsets in a defined area. Each cell contains a base station which exchanges voice and data information with the handsets located within the cell's coverage area. When a call arrives for a particular handset, the controller determines the cell location of the requested handset and alerts the user with a notification alarm on the handset.

As aforementioned, one key advantage of this system is the ability of the user to work away from their work area while not missing incoming calls. A problem results from the fact that this inevitably increases the time the employee is away from his/her Personal Computer (PC) and its associated applications and databases. This reduction in access to valuable resources can harm productivity and limits the true freedom gained by the use of the portable telephone system.

The ability to communicate caller identification data from the central controller to the handset is well known. Generally, this information which includes the name and/or number of the calling party is transferred to the liquid crystal display (LCD) of the handset when the handset is alerted of an incoming call. Such an apparatus is typified in U.S. Pat. No. 5,581,599 Tsuji et al, issued Dec. 3, 1996, the disclosure of which is incorporated herein by reference. This innovation allows limited information about the calling party to become available to the user of the portable telephone. This information, although useful, does not allow a user to gain access to applications or databases that may be located on a PC. If a user required additional information about a calling party before accepting the call, it would necessitate access to a PC and the specific databases needed.

There are presently available digital telecommunication systems that allow data sessions between the portable handset and the central controller. These data sessions may be initiated by the user or by applications running on a personal computer (PC) connected to the controller. Samples of these systems include the Companion 200 and Meridian Companion Mobility Option (MCMO) produced by Northern Telecom Limited and the Pocket Communication Systems (PCS) PCS50E, PCS150E, and PCS2000E produced by SpectraLink Corporation. These data sessions allow the user to access applications located on a server connected to the central controller remotely through a handset. While the user is away from a PC, this system allows for the activating and running of computer programs that may be required without prescribing that the user be situated at the same location as the PC. This increased accessibility of information for the user while away from a PC does not directly aid in the case that the user requires additional information about a calling party prior to accepting an incoming call. Since the user has a predetermined amount of time to answer the call, there is not sufficient time to start a data session with an application to gain access to calling party information required.

SUMMARY OF THE INVENTION

It is an object of the present invention to overcome the disadvantage of the prior art and, in particular, to provide a technique whereby on receipt of an incoming call, may obtain further information about the calling party before deciding to accept the call.

According to a first aspect, the present invention provides a telephone communications network capable of operation in both data communication and voice communication mode, the network comprising: at least one display based telephone handset; a central switching controller coupled to the telephone handset and connectable to a external switched telephone network for selective switching of the telephone handset to the external switched network; and a central computing device connected to the central switching controller and controlling operation of the central switching controller by means of control software running on the central computing device and providing selective access by the telephone handset through the central switching controller to a database coupled to the control software, the database listing at least one attribute for a plurality of calling parties, wherein the control software operates, upon receipt of an incoming voice call from a calling party for the telephone handset, to obtain from the central switching controller identification of the calling party, to interrogate the database to determine whether the calling party is listed in the database, to start the telephone handset in a data communication mode with the database, to offer an attribute for the calling party from the database to a display on the telephone handset, to write the attribute for the calling party to the display on the telephone handset in the event that an attribute acceptance signal is sent from the telephone handset, to offer the incoming voice call to the display on the telephone handset, and to connect the voice call to the telephone handset in the event that a call acceptance signal is sent from the telephone handset.

According to a second aspect, the present invention provides a method of offering at least one attribute corresponding to a calling party to a display based telephone handset in a telephone communications network during the occurrence of an incoming voice call from the calling party to the telephone handset, the telephone communications network capable of operation in both data communication and voice communication mode and comprising at least one of the display based telephone handsets; a central switching controller coupled to the telephone handset and connectable to an external switched telephone network for selective switching of the telephone handset to the external switched network; and a central computing device connected to the central switching controller and controlling operation of the central switching controller by means of control software running on the central computing device and providing selective access by the telephone handset through the central switching controller to a database coupled to the control software, the database listing at least one attribute for a plurality of calling parties, the method comprising:

A) obtaining from the central switching controller identification of the calling party;

B) interrogating the database to determine whether the calling party is listed in the database;

C) starting the telephone handset in a data communication mode with the database;

D) offering an attribute for the calling party from the database to the display on the telephone handset;

E) writing the attribute for the calling party to the display on the telephone handset in the event that an attribute acceptance signal is sent from the telephone handset;

F) offering the incoming voice call to the display on the telephone handset; and G) connecting the voice call to the telephone handset in the event that a call acceptance signal is sent from the telephone handset.

According to a third aspect, the present invention provides a computer readable storage medium containing control software that when running on a central computing device connected to a central switching controller which is further coupled to at least one display based telephone handset capable of operation in both data communication and voice communication mode, controls the operation of the central switching controller through a plurality of control steps, wherein the central switching controller is connectable to an external switched telephone network for selective switching of the telephone handset to the external switched network; wherein the central computing device provides selective access by the telephone handset through the central switching controller to a database coupled to the control software, the database listing at least one attribute for a plurality of calling parties; and wherein the plurality of control steps performed while the telephone handset is not in a data communication mode and an incoming voice call for the telephone handset is received at the central switching controller comprise:

A) obtaining from the central switching controller identification of the calling party;

B) interrogating the database to determine whether the calling party is listed in the database;

C) starting the telephone handset in a data communication mode with the database;

D) offering an attribute for the calling party from the database to the display on the telephone handset;

E) writing the attribute for the calling party to the display on the telephone handset in the event that an attribute acceptance signal is sent from the telephone handset;

F) offering the incoming voice call to the display on the telephone handset; and G) connecting the voice call to the telephone handset in the event that a call acceptance signal is sent from the telephone handset.

BRIEF DESCRIPTION OF THE DRAWINGS

The preferred embodiment of the present invention will now be described with reference to the following figures, in which.

DETAILED DESCRIPTION OF THE PREFERRED EMBODIMENT

The preferred embodiment of the present invention requires the use of the Companion Applications Toolkit (CAT) Application Programming Interface (API) produced by Northern Telecom Limited of Montreal, Canada. This CAT API corresponds to Northern Telecom part number A0674796 and is publicly offered for sale by Northern Telecom. The software manual for this API is the CAT Version 1.1 help file using Microsoft Windows Help Application 4.00.950 and is incorporated herein by reference.

Figure 1:
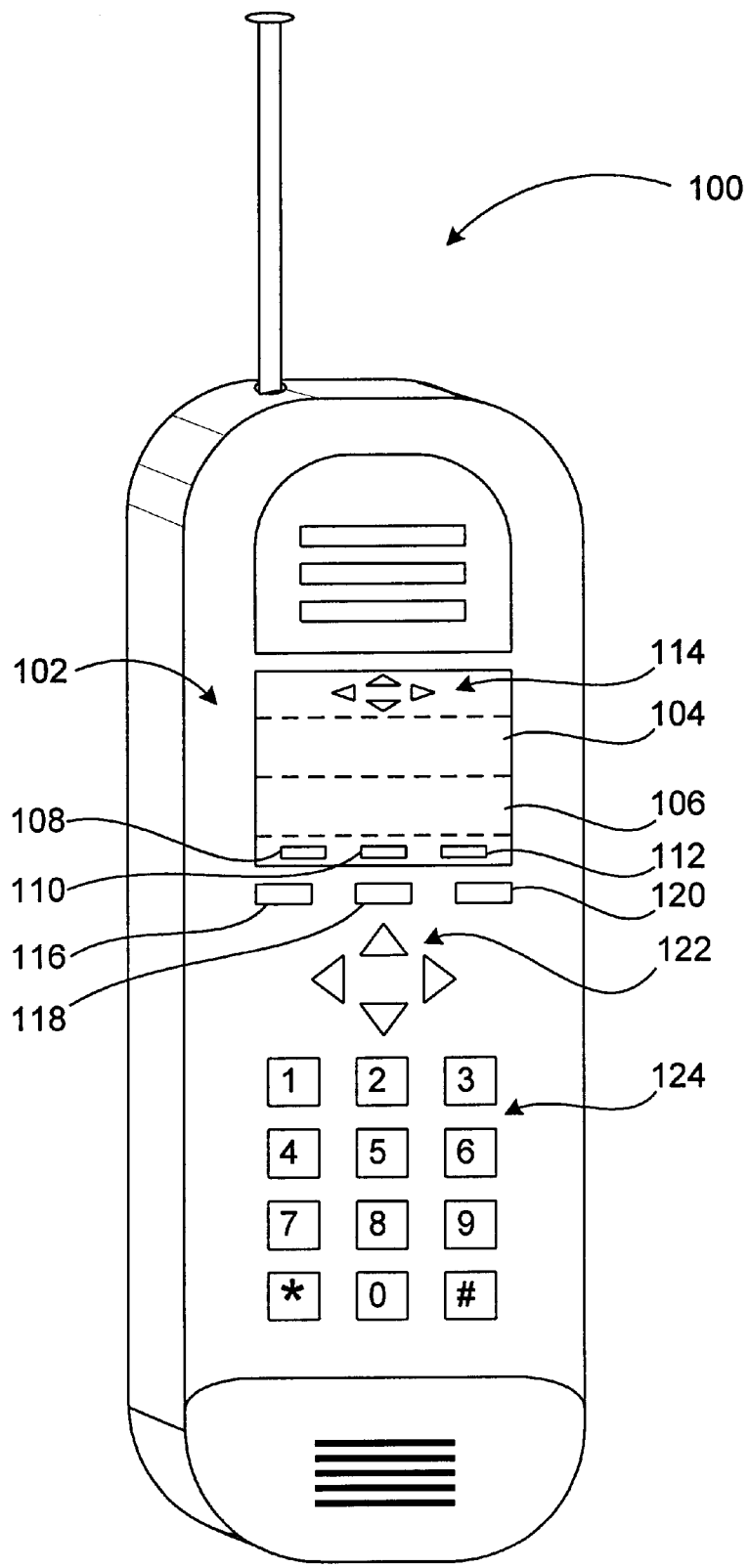
FIG. 1 is an illustration of a portable telephone handset in accordance with the preferred embodiment of the present invention.

FIG. 1 is an illustration of a portable telephone handset 100 in accordance with the present invention which, as will be described herein below is software configurable to provide enhanced telephone services in a voice and data communications network. The features of the handset 100 include a liquid crystal display (LCD) 102 with a first display line 104, a second display line 106, softkey icons 108,110,112, and navigational key (navkey) icons 114, softkey buttons 116,118,120, navkey buttons 122, and a dialpad 124. Software created using the CAT API controls the writing to the LCD 102 and the turning on or off of the softkey icons 108,110,112 and the navkey icons 114.

The process of turning on or off the softkey icons 108, 110,112 and navkey icons 114 includes activation and deactivation of the corresponding softkey buttons 116,118,120 and navkey buttons 122. The softkey icons 108,110,112 include a first softkey icon (left) 108, a second softkey icon (middle) 110, and a third softkey icon (right) 112 that correspond respectively to a first softkey button (left) 116, a second softkey button (middle) 118, and a third softkey button (right) 120 located below the softkey icons 108,110, 112 on the portable handset 100. Typically the second display line 106 of the LCD 102 is used to label the softkey icons 108,110,112 that are on by writing the appropriate labels directly above the particular softkey icons 108,110, 112 that are on.

Figure 2:
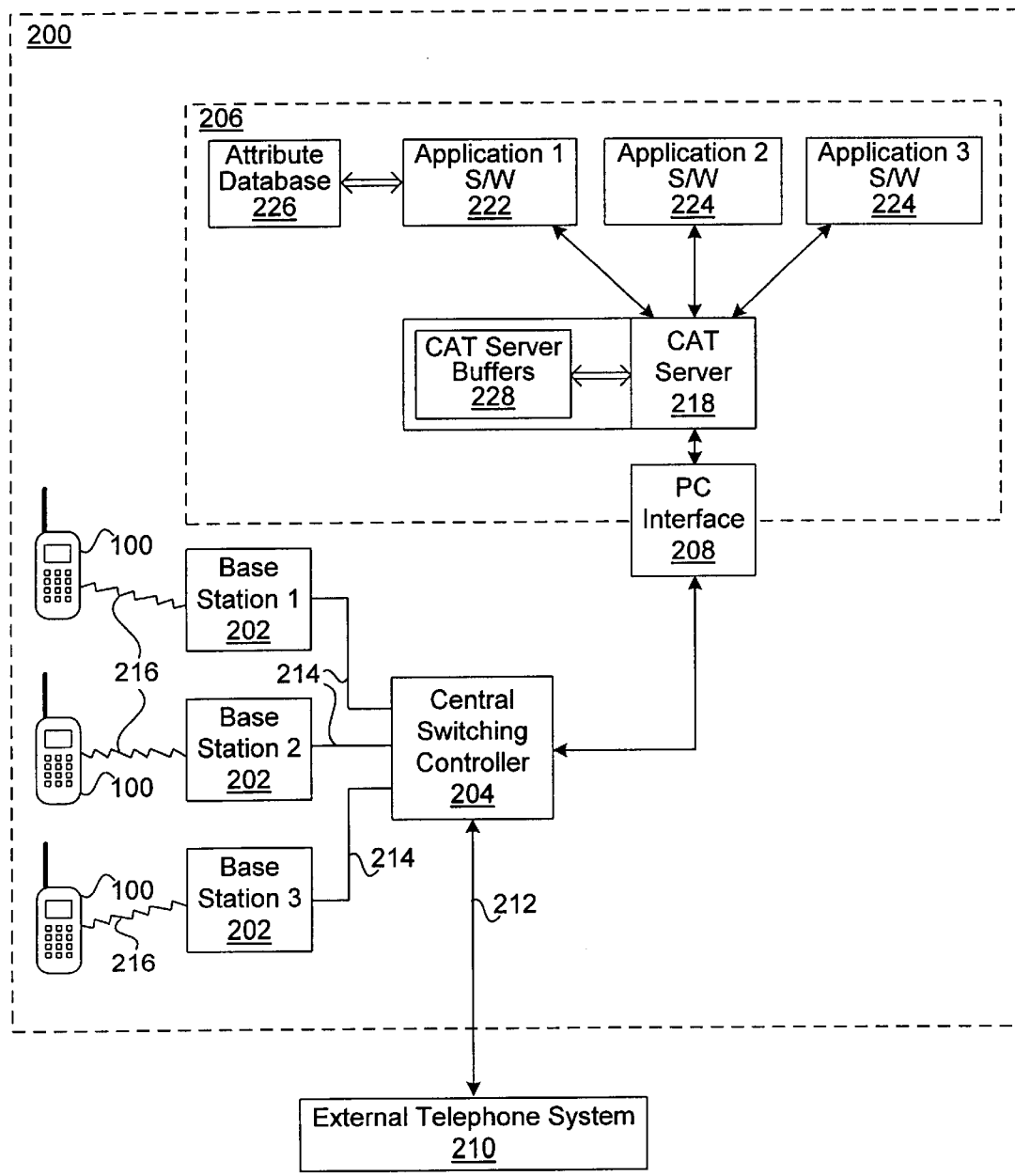
FIG. 2 is a block diagram of an in building portable telephone system in accordance with the preferred embodiment of the present invention.

FIG. 2 is a block diagram of an in building portable telephone system 200 in accordance with the preferred embodiment of the present invention, consisting of a plurality of portable telephone handsets 100, a plurality of base stations 202, a central switching controller 204 and a personal computer (PC) 206 connected to the controller 204 through a PC interface device 208. The central switching controller 204, the plurality of base stations 202, and the plurality of portable handsets 100 combined comprise the Companion 200 with Northern Telecom part number A0725269 in one embodiment and the Meridian Companion Mobility Option (MCMO) with Northern Telecom part number A0725270 in another embodiment. Both systems are produced by Northern Telecom Limited of Montreal, Canada.

The controller 204 connects the in building telephone system 200 to an external telephone system 210 through analog telephone lines 212. In the embodiment described above with the Companion 200, the external telephone system 210 consists of a Public Branch Exchange (PBX) which is further connected to a public switched telephone network and/or connected to PBXs of other telephone systems. In the embodiment described above with the MCMO, the central switching controller 204 is included within the PBX and the external telephone system 210 connected to the central switching controller 204 consists of a public switched telephone network and/or PBXs for other telephone systems.

The controller is connected to the portable handsets 100 through Time Compressed Multiplexing (TCM) telephone lines 214 between the controller 204 and the base stations 202, and radio channels 216 between the base stations 202 and the portable handsets 100.

The PC interface device 208 is used to translate data information and requests in the TCM form to the RS232 form that the PC 206 can process and translate data information and requests in the RS232 form to the TCM form that the central switching controller 204 can process. In the preferred embodiment, the PC interface device 208 is a Computer Telephony Adaptor (CTA) which consists of either a serial box CTA100 external to the PC with Northern Telecom part number A0646509 or a PC interface card CTA150 internal to the PC with Northern Telecom part number A0363108.

A Companion Applications Toolkit (CAT) server software 218 located within the PC 206 communicates with and has the capability to control the central switching controller 204 and the portable handsets 100 through the PC interface device 208 and regulates the operation of a software application contemplated by the present invention 222 and a plurality of other software applications 224 programmed with the CAT API. The software application contemplated by the present invention 222 also has selective access to an attribute database 226.

An example of a possible software application 224 generated with the CAT API is a personal directory look up application selectively initiated by the user of one of the portable handsets 100 that allows the user to search a personal directory database located within the PC 206 for information on specific individuals. An additional example is a nurse call system application which initiates a data session with one or more of the portable handsets 100 carried by the nurses within a hospital ward in the event of an emergency request by a patient and provides additional information about the particular patient such as his/her room number to the handsets 100 in such an occurrence. A further example of such a software application 224 is a stock inventory control application selectively initiated by the user of one of the portable handsets 100 that allows the user to access inventory databases located in the stock rooms or warehouses to determine if a product is in stock.

The CAT server software 218 is 16 bit software which operates under Microsoft WINDOWS versions 3.1, 3.11, and Win95. This server software 218 is capable of being upgraded to 32 bit software which can be operated under Microsoft WINDOWS versions Win95, Win98, and WinNT. There are four CAT server buffers 228 within the CAT server software 218 which store the string displayed on the first display line 104 of the LCD 102, the string displayed on the second display line 106 of the LCD 102, the status of the softkey icons 108,110,112 and the status of the navkey icons 114 associated with every portable handset 100 within the in building telephone system 200. This portable handset information is selectively updated in the CAT server buffers 228 and restored to the particular portable handsets 100 by the CAT server software 218 and its accompanying applications 222,224.

Figure 3:
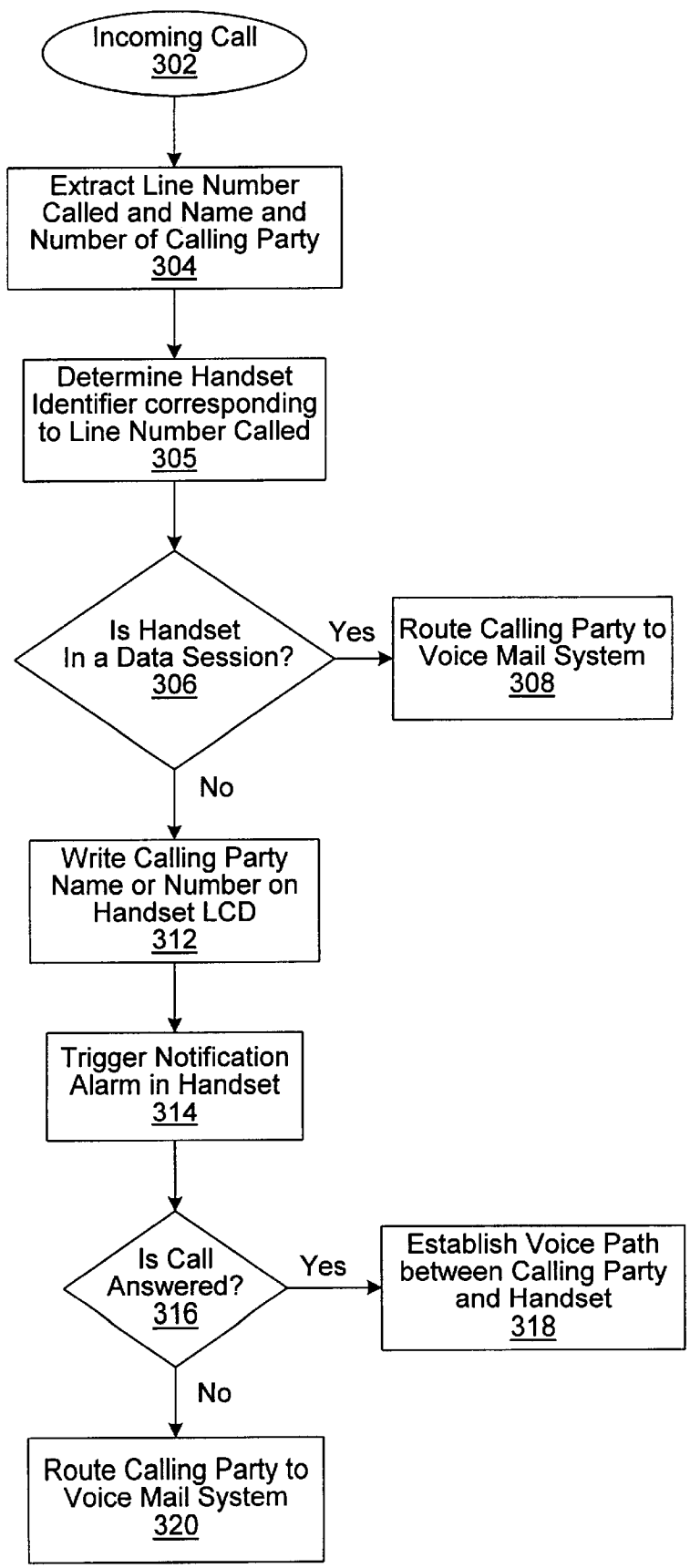
FIG. 3 is a flowchart illustrating the steps executed by the prior art software following receipt of an incoming call.

FIG. 3 is a flowchart illustrating the steps executed by typical prior art software following receipt of an incoming call. As depicted in steps 302 and 304, following an incoming call to the central controller 204, the line number called along with the name and number of the calling party are extracted. The name of the calling party is only extracted if the central switching controller 204 and the external telephone system 210 supports it. The controller 204 determines at step 305 the handset identifier that corresponds to the line number called.

A handset that is in a data session with an application 222,224 at step 306 appears busy at the central controller 204. In this circumstance, the calling party is routed at step 308 to the called handset identifier's corresponding voice mail box in order that the calling party can record a message for the user of the called handset 100. The data session that the called handset 100 is engaged in is not disturbed and the user of the called handset 100 is not notified of the calling party's desire to communicate with the user.

A called handset 100 that is not in a data session with an application 222,224 proceeds through a well known procedure controlled by the central switching controller. As depicted at step 312, the name or number of the calling party is written to the LCD 102 of the called handset 100. The notification alarm of the called handset 100 is triggered at step 314. If the called handset 100 user answers the notification alarm at step 316, the central controller 204 establishes a voice path between the calling party and the called handset 100 at step 318. In the circumstance that the called handset 100 user does not respond to the notification alarm at step 316, the calling party is routed at step 320 to the voice mail box as described above at step 308.

Figure 4A:
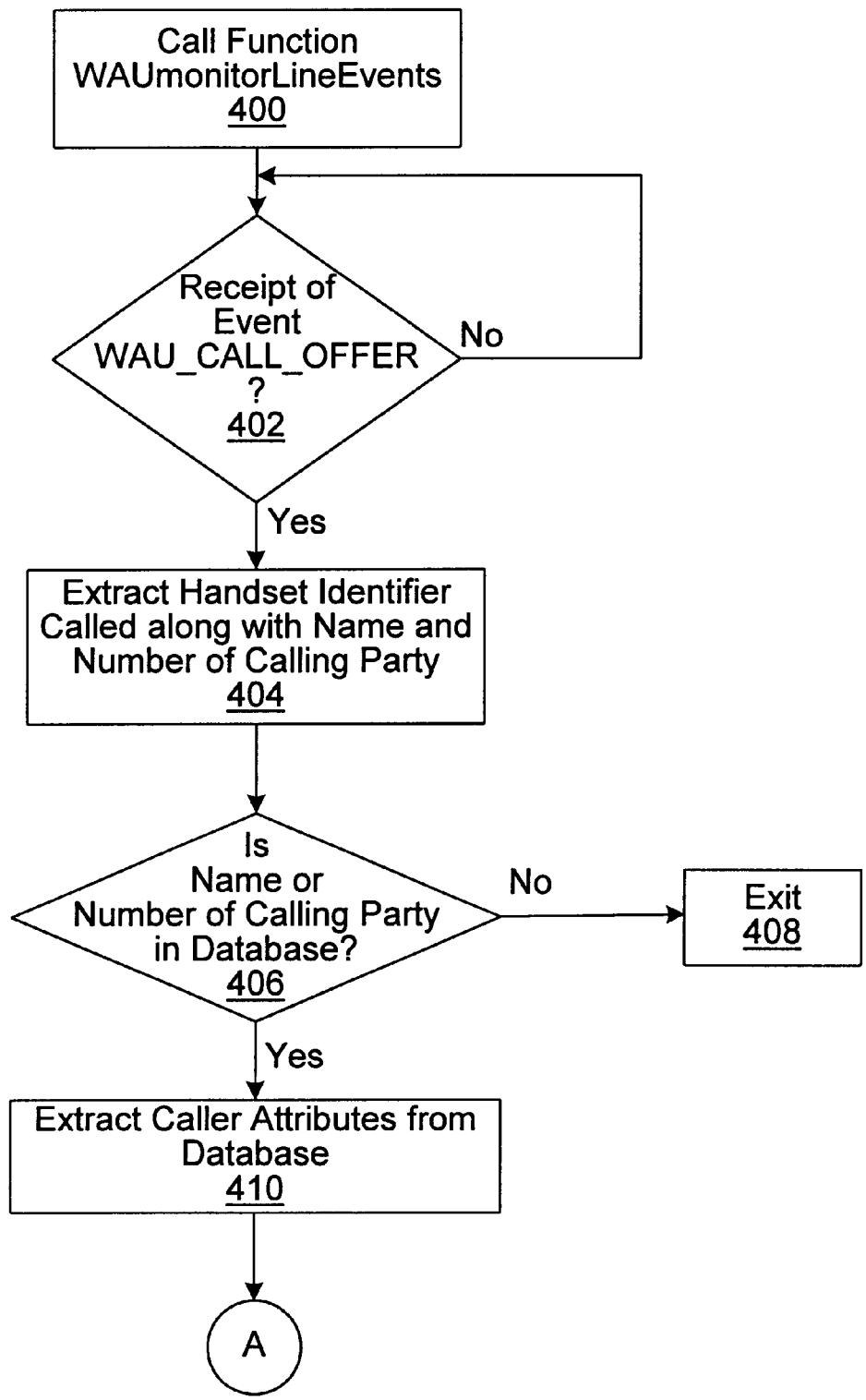
FIGS. 4a, 4b, and 4c are flowcharts illustrating the steps executed by the software application contemplated by the present invention following receipt of an incoming call.
Figure 4B:
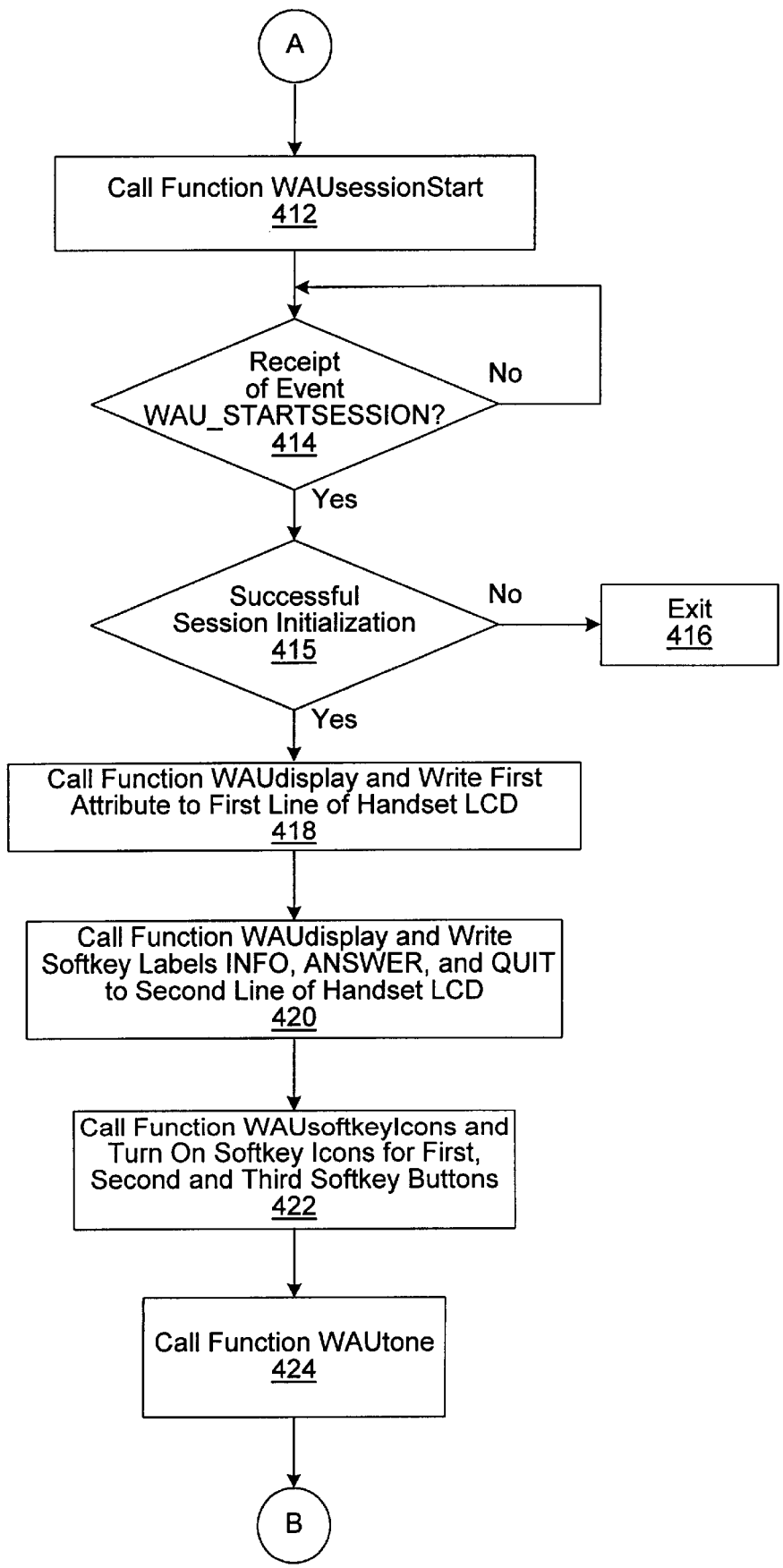
Figure 4C:
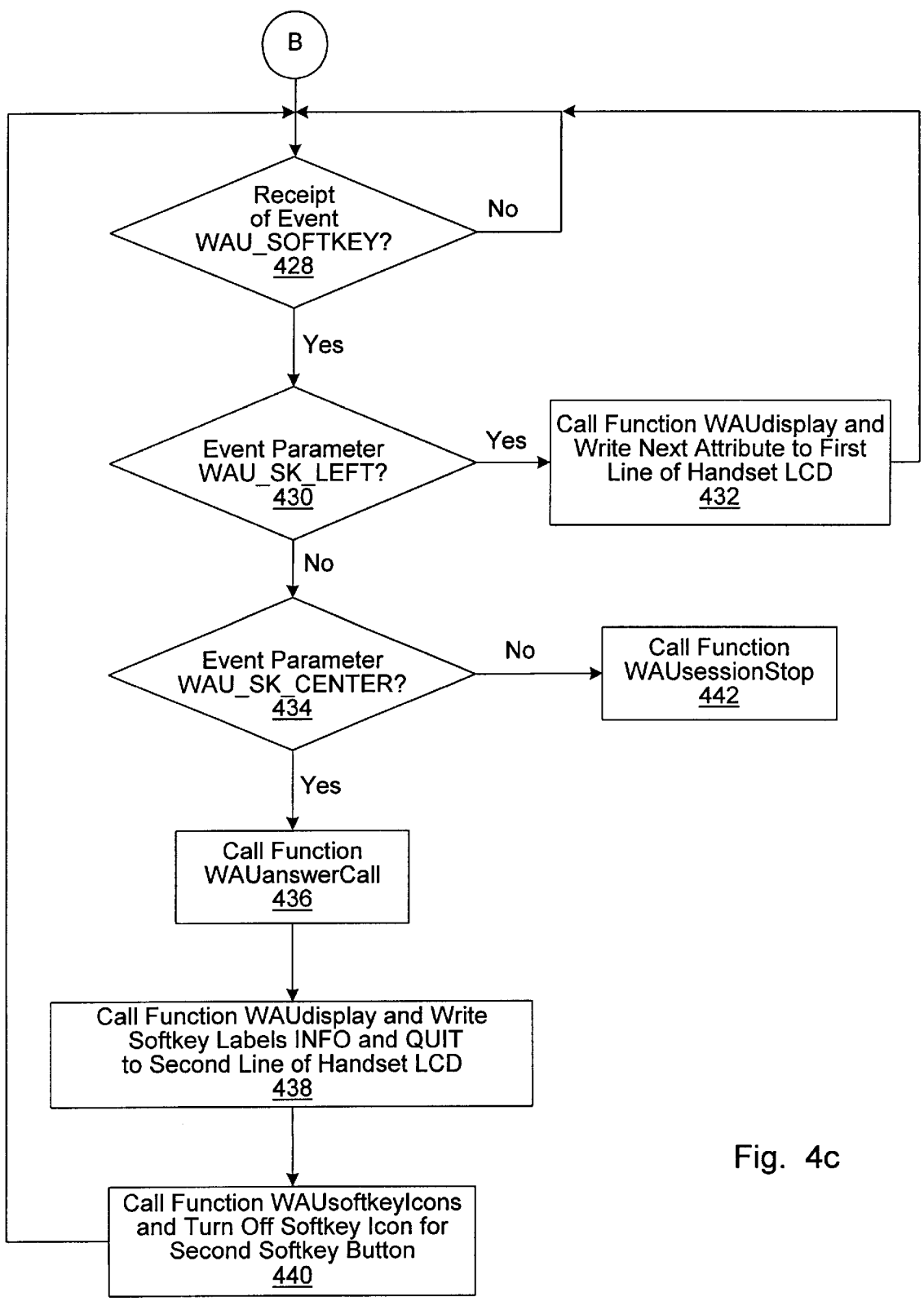

The sequence of steps, with reference to FIG. 4a, 4b, and 4c, executed by the software application contemplated by the preferred embodiment of the present invention 222 is now described. This software can be added as an additional application regulated by the existing CAT server software 218 with use of an upgrade diskette or through the down loading of the software contemplated by the present invention from an Internet webpage. WAU in all functions, events, and event parameters mentioned below represents Wireless Application Unit.

As depicted at step 400, CAT function WAUmonitorLineEvents is activated and tracks all phone line related activity on the in building telephone system 200. A WAU__CALL__OFFER event is received for every incoming call to every portable handset 100 in the system 200 at step 402. At the time of receipt of event WAU__CALL__OFFER the application 222 extracts from the WAU__CALL__OFFER event at step 404 the called handset identifier along with the name and number of the calling party. The called handset identifier is determined by the controller 204 after it extracts the called line number and is included as a parameter of the WAU__CALL__OFFER event. The calling party name is only extracted if this feature is supported by the central switching controller 204 and the external telephone system 210.

The name or number of the calling party is checked for within the database at step 406. If the name or number of the calling party is not located within the database or if the central switching controller 204 was unable to extract the name or number of the calling party at step 404 then the software application contemplated by the present invention 222 is exited at step 408. In the occurrence that the software application contemplated by the present invention 222 is exited, the sequence of events is identical to that described above for the prior art software at step 312 through to step 320.

As depicted at step 410, if the name or number of the calling party is found within the database at step 406, the name or number is used as a reference in the look up of additional information from the attribute database 226 located within the PC 206. This additional information can include, but is not limited by, personal names, age, sex, company names, financial information, credit card information, credit history, client priority information, client history, and medical history. This additional information is herein referred to as attributes.

Function WAUsessionStart is then executed at step 412 and an attempt is made to start a data session between the software application contemplated by the present invention 222 and the called handset 100. Event WAU_STARTSESSION is monitored at step 414 and the event parameters are examined at step 415 to verify that a successful data session has been started between the called handset 100 and the software application contemplated by the present invention 222. Reasons for an unsuccessful initiation of a data session include the called handset 100 being busy with another application 224, the called handset being out of range or turned off, the called handset 100 not responding, and the called handset identifier extracted not being valid or not being registered with the central switching controller 204. In the circumstance that there is an unsuccessful initialization, the software application contemplated by the present invention 222 is exited at step 416 and the resulting steps are similar to that described above for the prior art software at step 312 through step 320.

In the case that the data session initialization is successful, function WAUdisplay is called at step 418 and the first attribute in the database 226 is written to the first display line 104 of the LCD 102. Subsequently, function WAUdisplay is called again at step 420 and the softkey labels are written to the second display line 106 of the LCD 102 directly above the corresponding softkey icons 108,110,112 and softkey buttons 116,118,120. The first softkey button (left) 116 corresponding to the first softkey icon (left) 108 is labelled "INFO", the second softkey button (middle) 118 corresponding to the second softkey icon (middle) 110 is labelled "ANSWER", and the third softkey button (right) 120 corresponding to the third softkey icon (right) 112 is labelled "QUIT". The function WAUsoftkeyIcons is called at step 422 to turn on the first softkey icon (left) 108, the second softkey icon (middle) 110, and the third softkey button (right) 112 which in turn activates the first softkey button (left) 116, the second softkey button (middle) 118, and the third softkey button (right) 120. Function WAUtone is called at step 424 and the user is alerted of the incoming call through the sending of an ATTENTION tone to the called handset 100.

The sequence of steps executed by the software application contemplated by the present invention 222 is further described with reference to FIG. 4c. As depicted at step 428, upon receipt of the WAU_SOFTKEY event which indicates the pressing of one of the softkey buttons 116,118,120 by the user, the event parameter WAU_SK_LEFT is monitored for at step 430. The event parameter WAU_SK_LEFT indicates the pressing of the first softkey button (left) 116 at step 428 referring to the first softkey icon (left) 108 which is labelled "INFO". This results at step 432 in the calling of function WAUdisplay and the writing of the next attribute in the database 226 corresponding to the calling party to the first display line 104 of the LCD 102. The sequence of steps then returns to step 428 and responds to the receipt of event WAU_SOFTKEY as described above.

If the event parameter WAU_SK_LEFT is not received at step 430, event parameter WAU_SK_CENTER is then monitored for at step 434. The event parameter WAU_SK_CENTER indicates the pressing of the second softkey button (middle) 118 at step 428 referring to the second softkey icon (middle) 110 which is labelled "ANSWER". This results at step 436 in the execution of function WAUanswerCall which establishes a voice communication path through the central switching controller 204 between the calling party and the called handset 100. The option of answering the call is then removed from the called handset 100. This is first done by calling function WAUdisplay at step 438 and relabelling the softkey buttons 116,118,120 as described above at step 420. The first softkey button (left) 116 corresponding to the first softkey icon (left) 108 is relabelled "INFO" and the third softkey button (right) 120 corresponding to the third softkey icon (right) 112 is relabelled "IGNORE" while the second softkey button (middle) 118 corresponding to the second softkey icon (middle) 110 has its label removed. Next, function WAUsoftkeyIcons is called and the second softkey icon (middle) 110 is turned off at step 440 which in turn deactivates the second softkey button (middle) 118. The sequence of steps then returns to step 428 and responds to the receipt of event WAU_SOFTKEY as described above. In this circumstance, the user of the called handset 100 may continue to access attributes corresponding to the calling party from the database concurrently with the voice communication between the called handset 100 and the calling party by pressing the first softkey button (left) 116 corresponding to the first softkey icon (left) which is labelled "INFO".

If the event parameter WAU_SK_CENTER is not received at step 434, the pressing of the third softkey button (right) 120 at step 428 corresponding to the third softkey icon (right) 112 which is labelled "QUIT" is indicated. In this situation, the function WAUsessionStop is executed at step 442 and the data session with the called handset 100 is terminated. If the function WAUanswerCall was executed in a prior step to the execution of function WAUsessionStop, the sequence of events following receipt of an incoming call while the portable handset is not in a data session with an application 222,224 is then complete.

If the function WAUanswerCall was not executed in a prior step to the execution of function WAUsessionStop, the sequence of events is identical to that described above for the prior art software at step 316 through to step 320.

One alternative embodiment to the implementation outlined above for the preferred embodiment of the software application contemplated by the present invention 222 is to implement the software contemplated by the present invention within the CAT server software 218. One key advantage to this alternative embodiment is that it is transparent to a software programmer using the CAT API to design additional applications 224 for the in building telephone system 200.

Another embodiment of the present invention has the software contemplated by the present invention within a memory storage unit. Examples of memory storage units include, but are not limited by, a computer diskette, a memory unit linked to an Internet home page, and a PC hard drive.

Yet another embodiment of the present invention has the database 226 located within a computing device other than the PC 206 described above. This computing device other than the PC 206 described above being connected to the PC 206 described above through a network external to the telephone communications network.

The embodiments of the invention herein above disclosed rely on block diagrams to describe certain apparatus and their respective functions. Similarly, software functions are depicted by flowcharts of predetermined functional steps that are followed to achieve desired performance from the equipment described. These diagrams represent certain hardware and software features that would be known to those skilled in the art to whom this specification is addressed, although not in the novel combinations disclosed. Accordingly, the foregoing constitutes a sufficient description to such individuals for a comprehensive understanding of the best mode to give effect to the embodiments as disclosed and claimed herein. Although program listings have not been included to disclose the precise manner of digital computer programming to perform the operations desired, the detailed functional description presented herein, together with related flowcharts would permit a skilled programmer to program the software contemplated by the present invention to perform all operations described.

Persons skilled in the art will appreciate that there are alternative implementations and modifications possible to allow incoming voice calls to be offered to telephone handsets while in a data session with an application, and that the above method is only an illustration of this embodiment of the invention. For example, one skilled in the art could design an alternative implementation in a fixed line telephone system within the scope of the invention. This would require an altered hardware system accompanying a similar software as contemplated in the present invention. The scope of the invention, therefore, is only to be limited by the claims appended hereto.

What is claimed is:

1. A telephone communications network capable of operation in both data communication and voice communication mode, the network comprising:

at least one display based telephone handset;

a central switching controller coupled to the telephone handset and connectable to an external switched telephone network for selective switching of the telephone handset to the external switched network; and a central computing device connected to the central switching controller and controlling operation of the central switching controller by means of control software running on the central computing device and providing selective access by the telephone handset through the central switching controller to a database coupled to the control software, the database listing at least one attribute for a plurality of calling parties;

wherein the control software operates, upon receipt of an incoming voice call from a calling party for the telephone handset to obtain from the central switching controller identification of the calling party to interrogate the database and determine at least one attribute for the calling party using the identification of the calling party; to start the telephone handset in a data communication mode with the database to offer the attribute for the calling party to a display on the telephone handset to offer the incoming voice call to the telephone handset if the offer for the incoming voice call is accepted, to connect the voice call to the telephone handset; and if the offer for the attribute for the calling party is accepted, to write the attribute for the calling party to the display on the telephone handset no matter if the offer for the incoming voice call has previously been accepted or not.

2. A telephone communications network according to claim 1, wherein the telephone communications network comprises a plurality of the display based telephone handsets, the control software within the central computing device being capable of controlling operation of each of the telephone handsets.

3. A telephone communications network according to claim 1, wherein the database is located within the central computing device.

4. A telephone communications network according to claim 1, wherein the central switching controller is coupled to the telephone handset through a base station, the central switching controller is connected to the base station through fixed wire, and the telephone handset is in communication with the base station through a radio channel.

5. A telephone communications network according to claim 1, wherein the central switching controller is coupled to the telephone handset through fixed wire.

6. A communications network according to claim 1, wherein the identification of the calling party comprises at least one of the name and number of the calling party.

7. A communications network according to claim 1, wherein prior to the offer of the attribute for the calling party to a display on the telephone handset, the control software further operates to write the identification of the calling party to the display of the telephone handset.

8. A communications network according to claim 1, wherein the control software operates to offer the incoming voice call to the telephone handset by sending a notification signal to the telephone handset.

9. A communications network according to claim 1, wherein the control software operates to offer the attribute for the calling party by labelling a softkey button on the telephone handset with an attribute acceptance string and the offer for the incoming voice call is accepted if the labelled softkey button is pressed.

10. A telephone communications network according to claim 9, wherein the control software further operates to offer termination of the data communication mode with the database to the display on the party;

B) interrogating a database listing at least one attribute for a plurality of calling parties and determining at least one attribute for the calling party using the identification of the calling party;

C) starting the telephone handset in a data communication mode with the database;

D) offering the attribute for the calling party from the database to the display on the telephone handset;

E) offering the incoming voice call to the telephone handset;

F) if the offer for the incoming voice call is accepted, connecting the voice call to the telephone handset; and G) if the offer for the attribute for the calling party is accepted, writing the attribute for the calling party to the display on the telephone handset no matter if the offer for the incoming voice call has previously been accepted or not.

11. A telephone communications network according to claim 9, wherein to offer an attribute for the calling party from the database to a display on the telephone handset further includes activating the labelled softkey button.

12. A telephone communications network according to claim 9, wherein the control software operates to offer the attribute for the calling party to a display on the telephone handset after the offer for the incoming voice call has previously been accepted by maintaining the attribute acceptance string on the display as a label for the corresponding softkey button.

13. A telephone communications network according to claim 1, wherein the database is located external to the central computing device and is coupled to the control software through a computing network external to the telephone communications network.

14. A telephone communications network according to claim 9, wherein the control software operates to offer the incoming voice call to the display on the telephone handset by labelling a further softkey button on the telephone handset with a call acceptance string and the offer for the incoming voice call is accepted if the further softkey button is pressed.

15. A telephone communications network according to claim 14, wherein the control software further operates after the connection of the voice call to the telephone handset to remove the call acceptance string from the display of the telephone handset.

16. A method of displaying at least one attribute corresponding to a calling party on a display based telephone handset in a telephone communications network during the occurrence of an incoming voice call from the calling party to the telephone handset, the telephone communications network capable of operation in both data communication and voice communication mode, the method comprising:
A) obtaining from a central switching controller identification of the calling party;
B) interrogating a database listing at least one attribute for a plurality of calling parties and determining at least one attribute for the calling party using the identification of the calling party;
C) starting the telephone handset in a data communication mode with the database;
D) offering the attribute for the calling party from the database to the display on the telephone handset;
E) offering the incoming voice call to the telephone handset;
F) if the offer for the incoming voice call is accepted, connecting the voice with the database in the event that the further softkey button is pressed.

17. The method according to claim 16, wherein offering an attribute for the calling party from the database to a display on the telephone handset further includes activating the labelled softkey button.

18. A method according to claim 16, wherein the identification of the calling party comprises at least one of the name and number of the calling party.

19. A method according to claim 21 further comprising writing the identification of the calling party to the display of the telephone handset prior to the offering of the attribute for the calling party to the display on the telephone handset.

20. A method according to claim 16, wherein the offering the incoming voice call to the telephone handset comprises sending a notification signal to the telephone handset.

21. A method according to claim 17, wherein the offering the attribute for the calling party to the display on the telephone handset comprises labelling a softkey button on the telephone handset with an attribute acceptance string and the offer for the incoming voice call is accepted if the labelled softkey button is pressed.

22. The method of claim 21, wherein offering the attribute for the calling party to a display on the telephone handset after the offer for the incoming voice call has previously been accepted comprises maintaining the attribute acceptance string on the display as a label for the corresponding softkey button.

23. The method of claim 21, further comprising offering termination of the data communication mode with the database to the display on the telephone handset by labelling a further softkey button on the telephone handset with a termination acceptance string and terminating the data communication mode with the database in the event that the further softkey button is pressed.

24. The method of claim 21, wherein the offering the incoming voice call to the display on the telephone handset comprises labelling a further softkey button on the telephone handset with a call acceptance string and the offer for the incoming voice call is accepted if the further softkey button is pressed.

25. The method of claim 24, further comprising removing the call acceptance string from the display of the telephone handset after the connection of the voice call to the telephone handset.

26. A computer readable storage medium containing control software that when running on a central computing device connected to a central switching controller which is further coupled to at least one display based telephone handset capable of operation in both data communication and voice communication mode, controls the operation of the central switching controller through a plurality of control steps,
wherein the plurality of control steps performed while the telephone handset is not in a data communication mode and an incoming voice call for the telephone handset is received at the central switching controller comprise:
A) obtaining from the central switching controller identification of the calling telephone handset by labelling a further softkey button on the telephone handset with a termination acceptance string and to terminate the data communication mode with the database in the event that the further softkey button is pressed.

27. A computer readable storage medium according to claim 26, wherein the plurality of control steps offering the attribute to the display on the telephone handset comprises labelling a softkey button on the telephone handset with an attribute acceptance string and the offer for the incoming voice call is accepted if the labelled softkey button is pressed.

28. A computer readable storage medium according to claim 27, wherein the plurality of control steps further comprise offering termination of the data communication mode with the database to the display on the telephone handset by labelling a further softkey button on the telephone handset with a termination acceptance string and terminating the data communication mode call to the telephone handset; and
G) if the offer for the attribute for the calling pass is accepted, writing the attribute for the calling party to the display on the telephone handset no matter if the offer for the incoming voice call has previously been accepted or not.

29. A computer readable storage medium according to claim 27, wherein the plurality of control steps offering the incoming voice call to the display on the telephone handset comprises labelling a further softkey button on the telephone handset with a call acceptance string and the offer for the incoming voice call is accepted if the further softkey button is pressed.

30. A computing device arranged to be coupled within a telephone communications network capable of operation in both data communication and voice communication mode, the computing device, with the use of control software, controlling operation of a central switching controller within the telephone communications network and providing selective access by a telephone handset through the central switching controller to a database, the database listing at least one attribute for a plurality of calling parties; and
wherein the control software operates, upon receipt of an incoming voice call from a calling party for the telephone handset; to obtain from the central switching controller identification of the calling party; to interrogate the database and determine at least one attribute for the calling party using the identification of the calling party; to start the telephone handset in a data communication mode with the database; to offer the attribute for the calling party to a display on the telephone handset; to offer the incoming voice call to the telephone handset; if the offer for the incoming voice call is accepted, to connect the voice call to the telephone handset; and if the offer for the attribute for the calling party is accepted, to write the attribute for the calling party to the display on the telephone handset no mater if the offer for the incoming voice call has previously been accepted or not.

31. A computing device according to claim 30, wherein the identification of the calling party comprises at least one of the name and number of the calling party.

32. A computing device according to claim 30, wherein prior to the offer of the attribute for the calling party to a display on the telephone handset, the control software further operates to write the identification of the calling party to the display of the telephone handset.

33. A computing device according to claim 30, wherein the control software operates to offer the incoming voice call to the telephone handset by sending a notification signal to the telephone handset.

34. A computing device according to claim 30, wherein the control software operates to offer the attribute for the calling party by labelling a softkey button on the telephone handset with an attribute acceptance string and the offer for the incoming voice call is accepted if the labelled softkey button is pressed.

35. A computing device according to claim 34, wherein to offer an attribute for the calling party from the database to a display on the telephone handset further includes activating the labelled softkey button.

36. A computing device according to claim 34, wherein the control software operates to offer the attribute for the calling party to a display on the telephone handset after the offer or the incoming voice call has previously been accepted by maintaining the attribute acceptance string on the display as a label for the corresponding softkey button.

37. A computing device according to claim 34, wherein the control software further operates to offer termination of the data communication mode with the database to the display on the telephone handset by labelling a further softkey button on the telephone handset with a termination acceptance string and to terminate the data communication mode with the database in the event that the further softkey button is pressed.

38. A computing device according to claim 34, wherein the control software operates to offer the incoming voice call to the display on the telephone handset by labelling a further softkey button on the telephone handset with a call acceptance string and the offer for the incoming voice call is accepted if the further softkey button is pressed.

39. A computing device according to claim 38, wherein the control software further operates after the connection of the voice call to the telephone handset to remove the call acceptance string from the display of the telephone handset.

40. A telephone communications network capable of operation in both data communication and voice communication mode, the network comprising:

at least one display based telephone handset;
   a central switching controller coupled to the telephone handset and connectable to a external switched telephone network for selective switching of the telephone handset to the external switched network; and
   a central computing device connected to the central switching controller and controlling operation of the central switching controller by means of control software running on the central computing device and providing selective access by the telephone handset through the central switching controller to a database coupled to the control software, the database listing a plurality of attributes for a plurality of calling parties; and
   wherein the control software operates, upon receipt of an incoming voice call from a calling party for the telephone handset, to obtain from the central switching controller identification of the calling party; to interrogate the database and determine a plurality of attributes for the calling party using the identification of the calling party; to start the telephone handset in a data communication mode with the database; to write at least one of the determined attributes for the calling party to a display on the telephone handset; to offer at least one further of the determined attributes for the calling party to a display on the telephone handset; to offer the incoming voice call to the telephone handset; if the offer for the incoming voice call is accepted, to connect the voice call to the telephone handset; and if the offer for the further attribute for the calling party is accepted, to write the further attribute for the calling party to the display on the telephone handset no matter if the offer for the incoming voice call has previously been accepted or not.

41. A method for displaying attributes corresponding to a calling party on a display based telephone handset in a telephone communications network during the occurrence of an incoming voice call from the calling party to the telephone handset, the telephone communications network capable of operation in both data communication and voice communication mode, the method comprising:

A) obtaining from a central switching controller identification of the calling party;
   B) interrogating a database listing a plurality of attributes for a plurality of calling parties to determine a plurality of attributes for the calling party using the identification of the calling party;
   C) starting the telephone handset in a data communication mode with the database;
   D) writing at least one of the determined attributes for the calling party to the display on the telephone handset;
   E) offering at least one further of the determined attributes for the calling party to the display on the telephone handset;
   F) offering the incoming voice call to the telephone handset;
   G) the offer for the incoming voice call is accepted, connecting the voice call to the telephone handset; and
   H) if the offer for the further attribute for the calling party is accepted, writing the further attribute for the calling party to the display on the telephone handset no matter if the offer for the incoming voice call has previously been accepted or not.

42. A computing device arranged to be coupled within a telephone communications network capable of operation in both data communication and voice communication mode, the computing device, with the use of control software, controlling operation of a central switching controller within the telephone communications network and providing selective access by a telephone handset through the central switching controller to a database, the database listing a plurality of attributes for a plurality of calling parties; and wherein the control software operates, upon receipt of an incoming voice call from a calling party for the telephone handset, to obtain from the central switching controller identification of the calling party; to interrogate the database and determine a plurality of attributes for the calling party using the identification of the calling party; to start the telephone handset in a data communication mode with the database; to write at least one of the determined attributes for the calling party to a display on the telephone handset; to offer at least one further of the determined attributes for the calling party to a display on the telephone handset; to offer the incoming voice call to the telephone handset; if the offer for the incoming voice call is accepted, to connect the voice call to the telephone handset: and if the offer for the further attribute for the calling party is accepted, to write the further attribute for the calling party to the display on the telephone handset no matter if the offer for the incoming voice call has previously been accepted or not. offer for the incoming voice call is accepted if the labelled softkey button is pressed.

* * * * *